United States Patent
Freeman (10) Patent No.: US 9,278,448 B2
(45) Date of Patent: Mar. 8, 2016

(54) POSITION CONTROL FOR A POSITIONING SYSTEM COMPRISING LARGER SCALE AND SMALLER SCALE POSITIONING MECHANISMS

(71) Applicant: The Boeing Company, Chicago, IL (US)

(72) Inventor: Philip L. Freeman, Summerville, SC (US)

(73) Assignee: THE BOEING COMPANY, Chicago, IL (US)

(*) Notice: Subject to any disclaimer, the term of this patent is extended or adjusted under 35 U.S.C. 154(b) by 586 days.

(21) Appl. No.: 13/751,981

(22) Filed: Jan. 28, 2013

(65) Prior Publication Data
US 2014/0214184 A1    Jul. 31, 2014

(51) Int. Cl.
| | | |
|---|---|---|
| G06F 19/00 | (2011.01) |
| B25J 9/16 | (2006.01) |
| G05B 19/29 | (2006.01) |
| G05D 3/00 | (2006.01) |

(52) U.S. Cl.
CPC .............. B25J 9/1615 (2013.01); G05B 19/298 (2013.01); *G05B 2219/40297* (2013.01); *G05D 3/00* (2013.01)

(58) Field of Classification Search
CPC ................ B25J 9/1615; G05B 19/298; G05B 2219/40297; G05D 3/00
USPC .................................... 700/60, 114, 186, 193
See application file for complete search history.

(56) References Cited

U.S. PATENT DOCUMENTS

| | | | | |
|---|---|---|---|---|
| 5,090,002 A | * | 2/1992 | Chow ................... | G05B 19/232 369/30.15 |
| 5,248,341 A | * | 9/1993 | Berry, Jr. ............ | B05B 13/0431 105/163.2 |
| 5,801,939 A | * | 9/1998 | Okazaki ................. | G05B 19/39 318/560 |

OTHER PUBLICATIONS

International Search Report and Written Opinion, dated Apr. 11, 2014, regarding Application No. PCT/US2013/074450, 12 pages.
Yang et al., "Dynamic Compensation Control of Flexible Macro-Micrco Manipulator Systems", IEEE Transactions on Control Systems Technology, IEEE Service Center, New York, NY, vol. 18, No. 1, Jan. 2010, pp. 143-151.
Hodac et al., "Decoupled Macro/Micro-Manipulator for Fast and Precise Assembly Operations: Design and Experiments", SPIE Conference on Microrobotics and Microassembly, Sep. 1999, pp. 122-130.

(Continued)

*Primary Examiner* — Kenneth M Lo
*Assistant Examiner* — Chad Rapp
(74) *Attorney, Agent, or Firm* — Yee & Associates, P.C.

(57) ABSTRACT

A method and apparatus for controlling a positioning mechanism comprising a smaller scale positioning mechanism for moving a tool within a smaller scale work space and a larger scale positioning mechanism for changing a position of the smaller scale work space within the larger scale work space. A commanded position for the tool is received by a processor unit. An error component is determined using a difference between the commanded position and a current position of the tool in the larger scale work space. A restoring component configured to move the tool toward a selected position in the smaller scale work space is determined. Control signals for controlling the smaller scale positioning mechanism and the larger scale positioning mechanism together to move the tool from the current position to the commanded position are generated using the error component and the restoring component.

20 Claims, 5 Drawing Sheets

(56) References Cited

OTHER PUBLICATIONS

Bowling et al., "Design of Macro/Mini Manipulators for Optimal Dynamic Perfomance," International Conference on Robotics and Automation, Apr. 1997, pp. 449-454.

Hollerbach et al., "Redundancy Resolution of Manipulators Through Torque Optimization," Massachusetts Institute of Technology Artificial Intelligence Laboratory Memo, Jan. 1986, 20 pages.

Kwon et al., "On the Coarse/Fine Dual-Stage Manipulators with Robust Perturbation Compensator," International Conference on Robotics & Automation, May 2001, pp. 121-126.

Khatib, "Reduced Effective Inertia in Macro-/Mini-Manipulator Systems," International Symposium on Robotics Research, copyright 1990, pp. 329-334.

Khatib, "A Unified Approach for Motion and Force Control of Robot Manipulators: The Operational Space Formulation," Journal of Robotics and Automation, vol. RA-3, No. 1, Feb. 1987, pp. 43-53.

Khatib, "Inertial Properties in Robotic Manipulation: An Object-Level Framework," International Journal of Robotics Research, vol. 14, No. 1, Feb. 1995, pp. 19-36.

O'Neil, "Divergence of Linear Acceleration-Based Redundancy Resolution Schemes," Transactions on Robotics and Automation, vol. 18, No. 4, Aug. 2002, pp. 625-631.

Sharon et al., "The Macro/Micro Manipulator: An Improved Architecture for Robot Control," IEEE Transactions on Robotics and Automation, Dec. 1988, 30 pages.

International Preliminary Report on Patentability, dated Jul. 28, 2015, regarding Application No. PCT/US2013/074450, 9 pages.

\* cited by examiner

POSITION CONTROL FOR A POSITIONING SYSTEM COMPRISING LARGER SCALE AND SMALLER SCALE POSITIONING MECHANISMS

BACKGROUND INFORMATION

1. Field

The present disclosure relates generally to automated systems and methods for positioning a tool relative to a workpiece for manufacturing or other purposes. More particularly, the present disclosure relates to controlling a positioning system comprising joint larger scale and smaller scale positioning mechanisms for positioning a tool in a work space.

2. Background

An automated positioning system may be used to perform a variety of manufacturing and other tasks. An automated positioning system may include a tool attached to a computer controlled positioning mechanism. The positioning mechanism may be configured to move the tool to various positions in a work space. For example, the positioning mechanism may be controlled to move the tool to various positions in the work space to perform various operations on a workpiece in the work space. A robotic arm is one example of a positioning mechanism that may be used in an automated positioning system.

For example, automated positioning systems are used in direct digital manufacturing. Direct digital manufacturing also may be referred to as additive manufacturing, additive free-form fabrication, solid free-form fabrication, rapid prototyping, layered manufacturing, or three-dimensional printing. Direct digital manufacturing machines may be used to produce three-dimensional solid objects from three-dimensional digital models of the objects. To produce an object, the direct digital manufacturing machine may lay down successive layers of liquid, powder, or sheet material corresponding to virtual cross sections from the digital model of the object. The layers are joined together or fused automatically to create the final object. Objects of almost any shape or having any geometric feature may be made using a direct digital manufacturing machine. A direct digital manufacturing machine also may be referred to as a three-dimensional printer.

Current direct digital manufacturing machines may have working volumes of approximately one cubic meter. It may be desirable to have direct digital manufacturing machines with larger working volumes to produce larger objects. For example, without limitation, it may be desirable to have direct digital manufacturing machines with working volumes of approximately ten cubic meters.

Efficiency of direct digital manufacturing processes may be improved if the nozzle or other tool for laying down material in a direct digital manufacturing machine may be moved throughout the working volume of the machine at relatively high speed and with relatively high acceleration. For example, without limitation, efficient direct digital manufacturing may be achieved with speeds of approximately 2 meters per second and accelerations of approximately 40 meters per second per second.

Larger volume versions of current direct digital manufacturing machine designs may require significantly stiffer and more massive linkages in the positioning mechanism to move the nozzle or other tool through the working volume at the higher speeds and accelerations desirable for efficiency. Larger motors may be required to move the larger linkages at the desired speeds and accelerations. As a result, such a machine may require more expensive components and may use more energy than current direct digital manufacturing machines.

Accordingly, it would be beneficial to have a method and apparatus that takes into account one or more of the issues discussed above as well as possibly other issues.

SUMMARY

A first illustrative embodiment provides an apparatus comprising a smaller scale positioning mechanism, a larger scale positioning mechanism, and a positioning system controller. The smaller scale positioning mechanism is configured to move a tool within a smaller scale work space. The larger scale positioning mechanism is configured to change a position of the smaller scale work space within a larger scale work space. The positioning system controller is configured to receive a position command identifying a commanded position for the tool within the larger scale work space, determine an error component using a difference between the commanded position and a current position of the tool in the larger scale work space, determine a restoring component configured to move the tool toward a selected position in the smaller scale work space, and generate control signals for controlling the smaller scale positioning mechanism and the larger scale positioning mechanism together to move the tool from the current position to the commanded position using the error component and the restoring component.

Another illustrative embodiment provides a method for controlling a positioning mechanism. A position command identifying a commanded position for a tool within a larger scale work space is received by a processor unit. A smaller scale positioning mechanism is configured to move the tool within a smaller scale work space. A larger scale positioning mechanism is configured to change a position of the smaller scale work space within the larger scale work space. An error component is determined by the processor unit using a difference between the commanded position and a current position of the tool in the larger scale work space. A restoring component configured to move the tool toward a selected position in the smaller scale work space is determined by the processor unit. Control signals for controlling the smaller scale positioning mechanism and the larger scale positioning mechanism together to move the tool from the current position to the commanded position are generated using the error component and the restoring component.

Another illustrative embodiment provides another method for controlling a positioning mechanism. A position command identifying a commanded position for a tool within a larger scale work space is received by a processor unit. A smaller scale positioning mechanism is configured to move the tool within a smaller scale work space. A larger scale positioning mechanism is configured to change a position of the smaller scale work space within the larger scale work space. An estimated velocity for the commanded position and an estimated acceleration for the commanded position are determined by the processor unit. A position of the smaller scale positioning mechanism, an integral of the position of the smaller scale positioning mechanism, a velocity of the smaller scale positioning mechanism, a position of the larger scale positioning mechanism, and a velocity of the larger scale positioning mechanism are determined by the processor unit. An error component is determined by the processor unit using a first difference between the commanded position and a first sum of the position of the smaller scale positioning mechanism and the position of the larger scale positioning mechanism and a second difference between the estimated velocity for the commanded position and a second sum of the velocity of the smaller scale positioning mechanism and the velocity of the larger scale positioning mechanism. A restoring component is determined by the processor unit using the integral of the position of the smaller scale positioning mechanism and the position of the smaller scale positioning mechanism. An acceleration for the smaller scale positioning mechanism and an acceleration for the larger scale positioning mechanism are determined using the error component, the restoring component, and the estimated acceleration for the commanded position. Control signals for controlling the smaller scale positioning mechanism and the larger scale positioning mechanism together to move the tool from the current position to the commanded position are generated using the acceleration for the smaller scale positioning mechanism and the acceleration for the larger scale positioning mechanism.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

DETAILED DESCRIPTION

The different illustrative embodiments recognize and take into account a number of different considerations. "A number," as used herein with reference to items, means one or more items. For example, "a number of different considerations" means one or more different considerations.

The different illustrative embodiments recognize and take into account that the working volume of most current direct digital manufacturing machines may be relatively small. For example, the working volume of most current direct digital manufacturing machines may not exceed 1 cubic meter. Current direct digital manufacturing machines that have larger working volumes may operate relatively slowly and with relatively low accelerations. As a result, larger current direct digital manufacturing machines may not be efficient enough for practical industrial use.

It has been proposed to use relatively large linear motors in the positioning mechanisms of larger volume direct digital manufacturing machines. The use of such motors may improve the speed and acceleration performance, and thus the efficiency, of such machines. However, the use of large linear motors in direct digital manufacturing machines may have undesirable drawbacks.

Linear motors may be more expensive than conventional motors and ball screws used in the positioning mechanisms of conventional direct digital manufacturing machines. Linear motors may only produce linear motion. Therefore, the use of linear motors may limit the use of articulated structures in the positioning mechanisms of direct digital manufacturing machines. Furthermore, linear motors may use more energy than the conventional motors used in conventional direct digital manufacturing machines. Therefore, the use of linear motors in a direct digital manufacturing machine may result in a higher cost of operation.

The different illustrative embodiments recognize and take into account that direct digital manufacturing processes typically may be characterized by the desire for relatively short bursts of high acceleration of a positioning mechanism over a relatively small envelope of acceleration in the working volume of a direct digital manufacturing machine. For example, such short bursts of high acceleration may be used at the start and stop of a trajectory segment. A relatively short burst of high acceleration also may be desired in turning a relatively small radius corner.

The different illustrative embodiments also recognize and take into account that a positioning mechanism comprising a joint larger scale positioning mechanism and a smaller scale positioning mechanism may be used to improve dynamic performance and efficiency in a direct digital manufacturing machine with a relatively large working volume. In such a positioning mechanism, a tool to be moved to desired positions in the working volume may be attached to the smaller scale positioning mechanism. The smaller scale positioning mechanism may use relatively small high-dynamic motors to move the tool around in a smaller scale work space. The smaller scale positioning mechanism may be attached to the larger scale positioning mechanism. The larger scale positioning mechanism may use relatively efficient low-dynamic motors to move the smaller scale positioning mechanism, and thus the smaller scale work space, around in a larger scale work space corresponding to the working volume of the direct digital manufacturing machine. Such a positioning mechanism may be referred to as a macro/mini machine.

The different illustrative embodiments also recognize and take into account that, in order to achieve desired speed and efficiency of operation of a positioning mechanism including a joint larger scale positioning mechanism and a smaller scale positioning mechanism, it may be desirable that relatively short bursts of acceleration over a relatively small envelope of acceleration are achieved primarily by operation of the smaller scale positioning mechanism. However, the smaller scale positioning mechanism may not be able to provide such acceleration if the position of the tool in the smaller scale work space at the start of the acceleration is not appropriate. In this case, the slower larger scale positioning mechanism may need to be relied upon to move the tool, thereby increasing the time to perform an operation and reducing efficiency.

For example, following a move to the left, a tool may be positioned at or near the left edge of the smaller scale work space of the smaller scale positioning mechanism. If the positioning mechanism is commanded to move the tool to the left again, the smaller scale positioning mechanism will not be able to accelerate the tool in the desired direction. In this case, the slower larger scale positioning mechanism must be relied upon to move the tool by moving the smaller scale positioning mechanism, and thus the smaller scale work space, in the desired direction.

In accordance with an illustrative embodiment, a positioning system may include a smaller scale positioning mechanism and a larger scale positioning mechanism. The smaller scale positioning mechanism may be configured to move a tool within a smaller scale work space. The larger scale positioning mechanism may be configured to change the position of the smaller scale work space within a larger scale work space. A positioning system controller may be configured to control the smaller scale positioning mechanism and the larger scale positioning mechanism to move the tool from a current position to a commanded position in the larger scale work space in a manner such that relatively short and high accelerations of the tool are provided by the smaller scale positioning mechanism. The positioning system controller may use a restoring component to generate control signals for controlling the smaller scale positioning mechanism and the larger scale positioning mechanism in a manner such that the position of the tool in the smaller scale work space is also driven toward a center of the smaller scale work space. Use of the restoring component in this manner may help to ensure that the tool is in an appropriate position in the smaller scale work space for the next acceleration in any direction.

Figure 1:
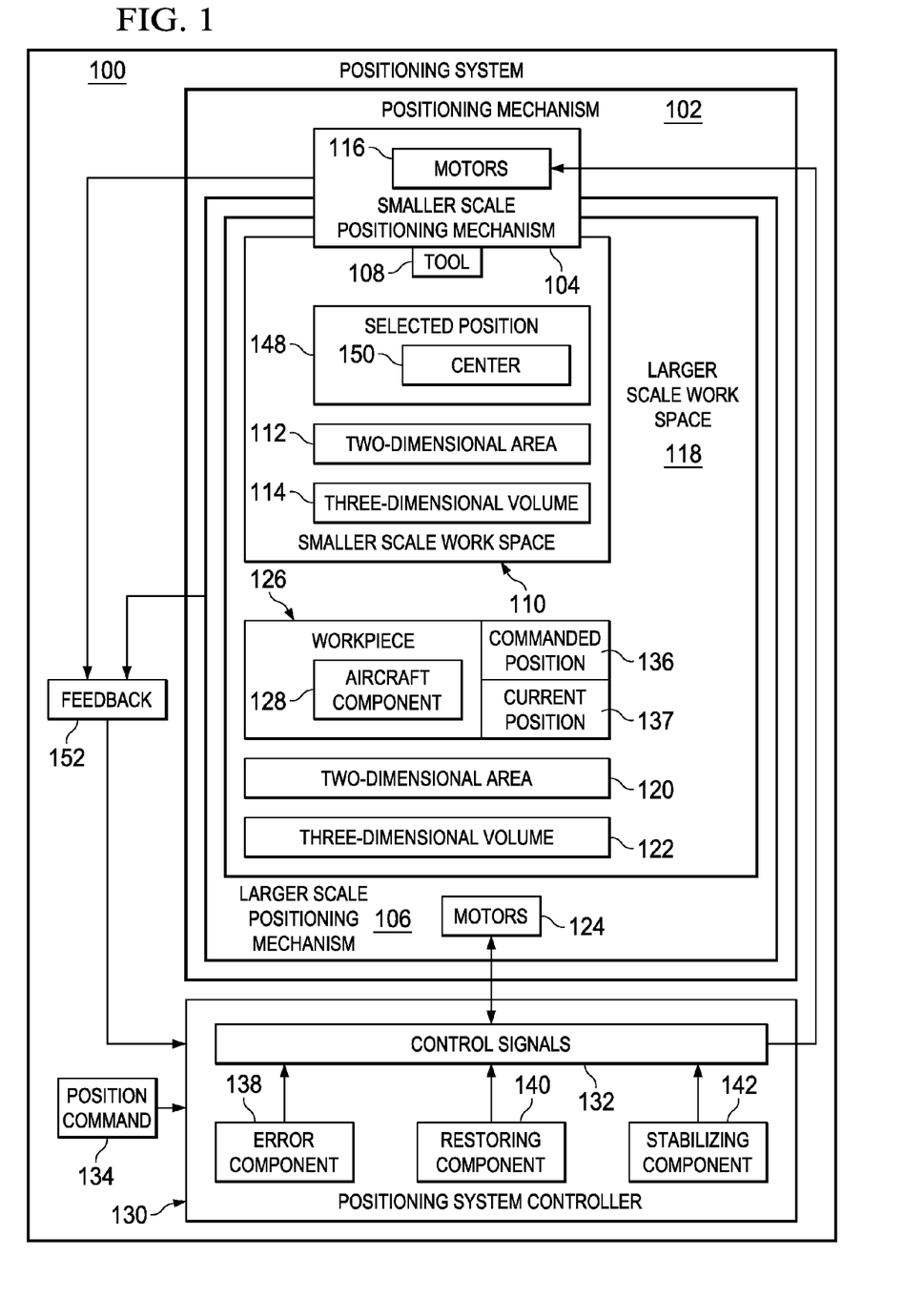
FIG. 1 is an illustration of a block diagram of a positioning system in accordance with an illustrative embodiment.

Turning now to FIG. 1, an illustration of a block diagram of a positioning system is depicted in accordance with an illustrative embodiment. Positioning system 100 may be used to perform any appropriate process. For example, without limitation, positioning system 100 may be used for manufacturing, assembly, disassembly, inspection, testing, rework, or any other appropriate process or combination of processes. For example, positioning system 100 may be part of a direct digital manufacturing machine used for direct digital manufacturing.

Positioning system 100 may include positioning mechanism 102. Positioning mechanism 102 may include smaller scale positioning mechanism 104 and larger scale positioning mechanism 106. Smaller scale positioning mechanism 104 may be referred to as a mini positioning mechanism. Larger scale positioning mechanism 106 may be referred to as a macro positioning mechanism. Positioning mechanism 102 may be referred to as a macro/mini positioning mechanism.

Tool 108 may be attached to smaller scale positioning mechanism 104. Tool 108 may include any appropriate device or structure that may be used for any appropriate purpose. For example, without limitation, tool 108 may include a nozzle, a tape laying head, or any other device or structure for depositing or applying any appropriate material. As another example, tool 108 may include a drill, a saw, a scraper, a sander, a sand blaster, or any other device or structure for removing any appropriate material. As a further example, tool 108 may include a lens, a sensor, or any other device or structure for destructive or non-destructive inspection or testing of any appropriate material. Tool 108 may include various devices or structures in any appropriate combination.

Smaller scale positioning mechanism 104 may be configured to move tool 108 within smaller scale work space 110. Smaller scale work space 110 may be two-dimensional area 112 or three-dimensional volume 114. Two-dimensional area 112 may be referred to as a first two-dimensional area. Three-dimensional volume 114 may be referred to as a first three-dimensional volume.

Positions in smaller scale work space 110 may be defined with reference to smaller scale positioning mechanism 104. Smaller scale positioning mechanism 104 may be configured to move tool 108 into any appropriate position in smaller scale work space 110. The position of tool 108 in smaller scale work space 110 may refer to the location of tool 108 in smaller scale work space 110, the orientation of tool 108 in smaller scale work space 110, or both.

Smaller scale positioning mechanism 104 may include any appropriate devices and structures that may be configured to move tool 108 in any number of degrees of freedom within smaller scale work space 110. Smaller scale positioning mechanism 104 may use motors 116 for moving tool 108 in smaller scale work space 110. Motors 116 may be relatively high dynamic motors that may be configured to move tool 108 at relatively high speeds and with relatively high rates of acceleration.

Larger scale positioning mechanism 106 may be configured to change the relative position of smaller scale work space 110 in larger scale work space 118. Larger scale work space 118 may correspond to the work space for positioning mechanism 102. Larger scale work space 118 may be two-dimensional area 120 or three-dimensional volume 122. Two-dimensional area 120 may be referred to as a second two-dimensional area. Three-dimensional volume 122 may be referred to as a second three-dimensional volume. The relative position of smaller scale work space 110 in larger scale work space 118 may refer to the location of smaller scale work space 110 in larger scale work space 118, the orientation of smaller scale work space 110 in larger scale work space 118, or both.

Larger scale positioning mechanism 106 may include any appropriate devices and structures that may be configured to change the relative position of smaller scale work space 110 in larger scale work space 118 in any number of degrees of freedom. For example, smaller scale positioning mechanism 104 may be attached to larger scale positioning mechanism 106. In this case, larger scale positioning mechanism 106 may be configured to move smaller scale positioning mechanism 104 within larger scale work space 118 to change the position of smaller scale work space 110 in larger scale work space 118. Alternatively, larger scale positioning mechanism 106 may be configured to move larger scale work space 118 with respect to smaller scale positioning mechanism 104 to change the position of smaller scale work space 110 in larger scale work space 118.

Larger scale positioning mechanism 106 may use motors 124 to change the relative position of smaller scale work space 110 in larger scale work space 118. For example, motors 124 may be larger and slower than motors 116 in smaller scale positioning mechanism 104.

Workpiece 126 may be positioned in larger scale work space 118. Workpiece 126 may include any structure and any material that may be operated on in any appropriate manner using tool 108. For example, without limitation, workpiece 126 may be aircraft component 128. Aircraft component 128 may include any part or portion of any type of aircraft. For example, aircraft component 128 may include an entire aircraft.

Positioning system controller 130 may be configured to control the movement of tool 108 throughout larger scale work space 118. For example, positioning system controller 130 may be configured to generate control signals 132. Control signals 132 may be configured for controlling motors 116 in smaller scale positioning mechanism 104 and motors 124 in larger scale positioning mechanism 106 in a manner such that smaller scale positioning mechanism 104 and larger scale positioning mechanism 106 together move tool 108 to desired positions in larger scale work space 118.

Positioning system controller 130 may be configured to receive position command 134. Position command 134 may identify commanded position 136 in larger scale work space 118. Commanded position 136 is a position in larger scale work space 118 to which tool 108 is to be moved. For example, without limitation, commanded position 136 may correspond to a position on or in workpiece 126 in larger scale work space 118.

Position command 134 may be provided to positioning system controller 130 from any appropriate source. For example, position command 134 may be provided by a human operator, a machine, or a human operator in combination with a machine.

For example, without limitation, position command 134 may comprise a sequence of positions in larger scale work space 118. The sequence of positions may correspond to interpolation points for a desired trajectory of tool 108 in larger scale work space 118. For example, the interpolation points may begin at current position 137 of tool 108 in larger scale work space 118 and may be spaced continuously in time. In this case, commanded position 136 may be determined from the next position in the sequence of positions. In this example, position command 134 may be generated and provided by a trajectory interpolator.

Positioning system controller 130 may be configured to generate control signals 132 for moving tool 108 from current position 137 to commanded position 136 using one or more of error component 138, restoring component 140, and stabilizing component 142, in any appropriate combination. For example, without limitation, positioning system controller 130 may be configured to determine an acceleration for smaller scale positioning mechanism 104 and an acceleration for larger scale positioning mechanism 106 using one or more of error component 138, restoring component 140, and stabilizing component 142 in combination with an estimated acceleration for commanded position 136. Positioning system controller 130 may be configured to generate control signals 132 using the acceleration for smaller scale positioning mechanism 104 and the acceleration for larger scale positioning mechanism 106.

Error component 138 may be configured to drive the position of tool 108 toward commanded position 136. Positioning system controller 130 may be configured to determine error component 138 using the difference between commanded position 136 and current position 137 of tool 108 in larger scale work space 118. For example, without limitation, positioning system controller 130 may be configured to determine error component 138 using a first difference between commanded position 136 and a sum of a position of smaller scale positioning mechanism 104 and a position of larger scale positioning mechanism 106 and a second difference between an estimated velocity for commanded position 136 and a sum of a velocity of smaller scale positioning mechanism 104 and a velocity of larger scale positioning mechanism 106.

Restoring component 140 may be configured to drive the position of tool 108 toward selected position 148 in smaller scale work space 110. For example, without limitation, selected position 148 may be center 150 of smaller scale work space 110. In this example, restoring component 140 may be used to help ensure that tool 108 is in an appropriate position in smaller scale work space 110 for the next acceleration of tool 108 in any direction in larger scale work space 118. For example, without limitation, positioning system controller 130 may be configured to determine restoring component 140 using an integral of the position of smaller scale positioning mechanism 104 and the position of smaller scale positioning mechanism 104.

Stabilizing component 142 may be configured to prevent unstable self-motion of larger scale positioning mechanism 106. Self-motion refers to motion of larger scale positioning mechanism 106 that causes no motion of tool 108. In a general acceleration minimization scheme, the velocities associated with self-motion are unstable. Stabilizing larger scale positioning mechanism 106 may stabilize positioning mechanism 102 as a whole.

Positioning system controller 130 may be configured to determine stabilizing component 142 to provide a feedback loop to stabilize the self-motion velocities of larger scale positioning mechanism 106. For example, without limitation, positioning system controller 130 may be configured to determine stabilizing component 142 using a velocity of larger scale positioning mechanism 106.

Current position 137 of tool 108 and other current parameters of smaller scale positioning mechanism 104 and larger scale positioning mechanism 106 may be determined using feedback 152 from smaller scale positioning mechanism 104 and larger scale positioning mechanism 106. Any appropriate device or method may be used to provide feedback 152 for desired current parameters of smaller scale positioning mechanism 104 and larger scale positioning mechanism 106 to positioning system controller 130.

In the present application, including in the claims, and unless stated otherwise, the position, velocity, and acceleration of smaller scale positioning mechanism 104 refers to the position, velocity, and acceleration, respectively, of tool 108 or of a portion of smaller scale positioning mechanism 104 to which tool 108 is attached. In the present application, including in the claims, and unless stated otherwise, the position, velocity, and acceleration of larger scale positioning mechanism 106 refers to the position, velocity, and acceleration, respectively, of smaller scale work space 110 with respect to larger scale work space 118. In the present application, including in the claims, "position" may refer to location or orientation or both, "velocity" may refer to linear velocity or angular velocity or both, and "acceleration" may refer to linear acceleration or angular acceleration or both.

The illustration of FIG. 1 is not meant to imply physical or architectural limitations to the manner in which illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 2:
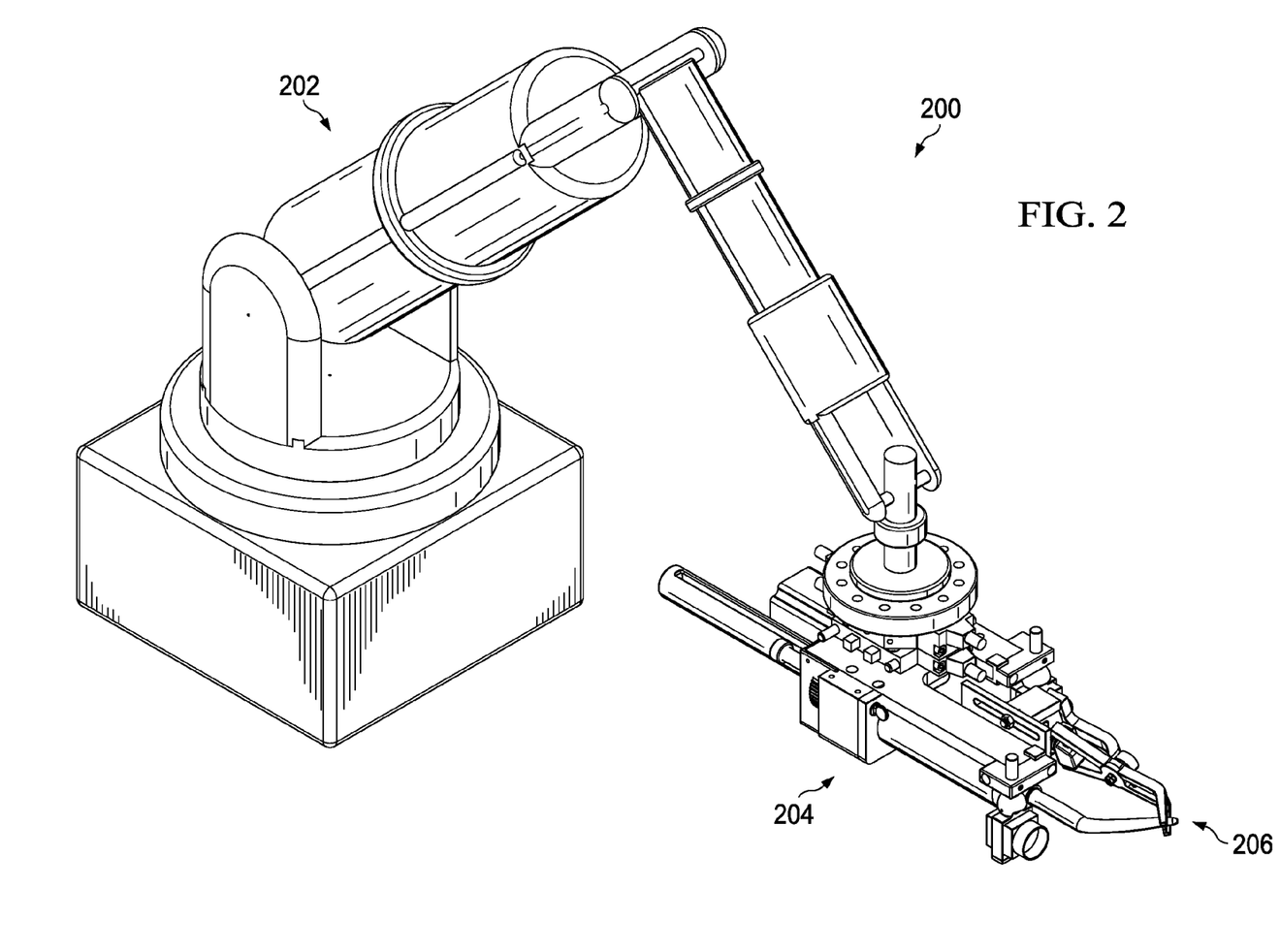
FIG. 2 is an illustration of a positioning mechanism in accordance with an illustrative embodiment.

Turning now to FIG. 2, an illustration of a positioning mechanism is depicted in accordance with an illustrative embodiment. In this example, positioning mechanism 200 is an example of one implementation of positioning mechanism 102 in FIG. 1.

Positioning mechanism 200 may include larger scale positioning mechanism 202 and smaller scale positioning mechanism 204. Smaller scale positioning mechanism 204 is attached to larger scale positioning mechanism 202. Tool 206 is attached to smaller scale positioning mechanism 204. Smaller scale positioning mechanism 204 may be configured to move tool 206 within a smaller scale work space defined with respect to smaller scale positioning mechanism 204.

Larger scale positioning mechanism 202 may be configured to move smaller scale positioning mechanism 204 in a larger scale work space. Thus, positioning mechanism 200 is an example of a positioning mechanism wherein a larger scale positioning mechanism moves a smaller scale work space within a larger scale work space to change the relative position of the smaller scale work space in the larger scale work space.

Figure 3:
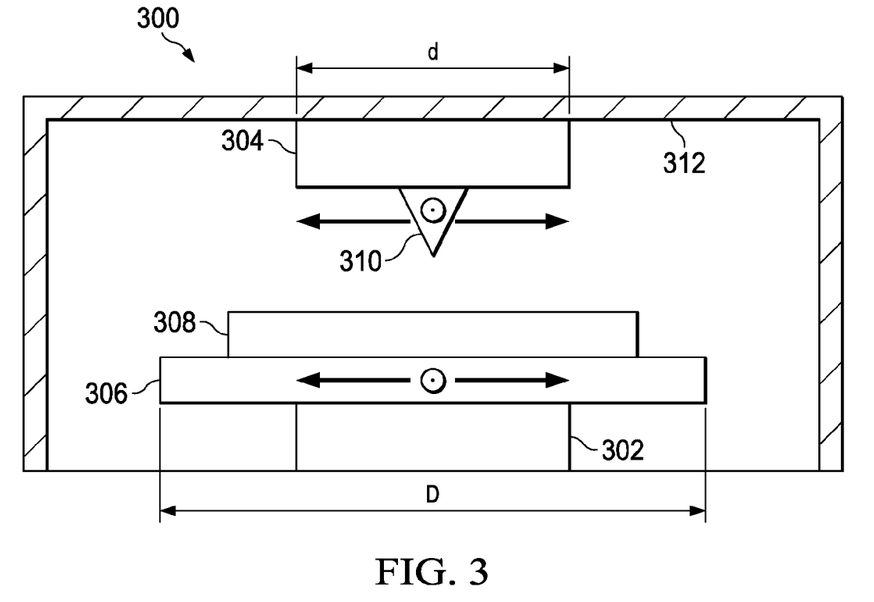
FIG. 3 is a schematic illustration of another positioning mechanism in accordance with an illustrative embodiment.

Turning now to FIG. 3, a schematic illustration of another positioning mechanism is depicted in accordance with an illustrative embodiment. In this example, positioning mechanism 300 is example of one implementation of positioning mechanism 102 in FIG. 1. Positioning mechanism 300 is an example of a positioning mechanism wherein a larger scale work space is moved with respect to a smaller scale work space to change the position of the smaller scale work space in the larger scale work space.

Positioning mechanism 300 includes larger scale positioning mechanism 302 and smaller scale positioning mechanism 304. Larger scale positioning mechanism 302 may be configured to move table 306 in a number of directions. In this example, the surface of table 306 may define a larger scale work space. Workpiece 308 may be positioned on table 306. Tool 310 may be attached to smaller scale positioning mechanism 304. Smaller scale positioning mechanism 304 may be configured to move tool 310 in a number of directions within a smaller scale work space defined by smaller scale positioning mechanism 304. Smaller scale positioning mechanism 304 may be supported in a fixed position on support structure 312. Thus, the smaller scale work space is fixed in position in positioning mechanism 300.

Figure 4:
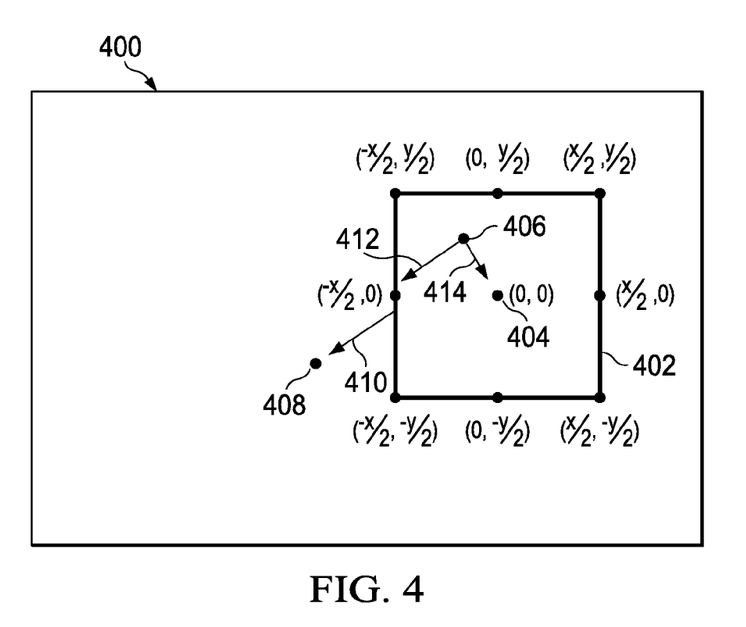
FIG. 4 is an illustration of controlling a positioning system in accordance with an illustrative embodiment.

Turning now to FIG. 4, an illustration of controlling a positioning system is depicted in accordance with an illustrative embodiment. In this example, larger scale work space 400 is an example of larger scale work space 118 in FIG. 1 and smaller scale work space 402 is an example of smaller scale work space 110 in FIG. 1.

In this example, point 404 indicates the center of smaller scale work space 402. Point 406 indicates the current position of a tool in larger scale work space 400 and smaller scale work space 402. Point 408 indicates a point in larger scale work space 400 to which the tool is commanded to move.

In accordance with an illustrative embodiment, the control signals for controlling movement of the tool include a component indicated by arrow 410 for moving smaller scale work space 402 toward point 408, a component indicated by arrow 412 for moving the tool in smaller scale work space 402 in the direction of point 408, and a component indicated by arrow 414 for moving the tool in the smaller scale work space in the direction of point 404.

Figure 5:
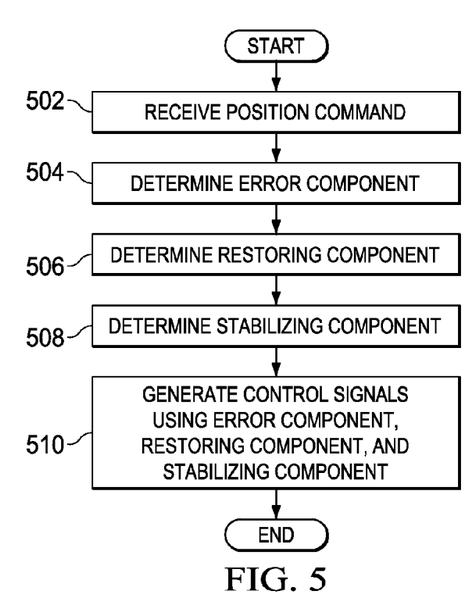
FIG. 5 is an illustration of a flowchart of a process for controlling a positioning system in accordance with an illustrative embodiment.

Turning now to FIG. 5, an illustration of a flowchart of a process for controlling a positioning system is depicted in accordance with an illustrative embodiment. The process of FIG. 5 may be used to control a positioning system comprising a smaller scale positioning mechanism configured to move a tool within a smaller scale work space and a larger scale positioning mechanism configured to change a position of the smaller scale work space within a larger scale work space. For example, the process of FIG. 5 may be implemented in positioning system controller 130 to control positioning system 100 in FIG. 1.

The process may begin by receiving a position command identifying a commanded position for the tool in the larger scale work space (operation 502). An error component may be determined using a difference between a current position of the tool in the larger scale work space and the commanded position (operation 504). A restoring component may be determined, wherein the restoring component is configured to move the tool toward a selected position in the smaller scale work space (operation 506). For example, the restoring component may be configured to move the tool toward the center of the smaller scale work space. A stabilizing component may be determined, wherein the stabilizing component is configured to prevent unstable self-motion of the larger scale positioning mechanism (operation 508). Control signals for controlling the smaller scale positioning mechanism and the larger scale positioning mechanism together to move the tool from the current position to the commanded position then may be generated using the error component, the restoring component, and the stabilizing component (operation 510), with the process terminating thereafter.

Figure 6:
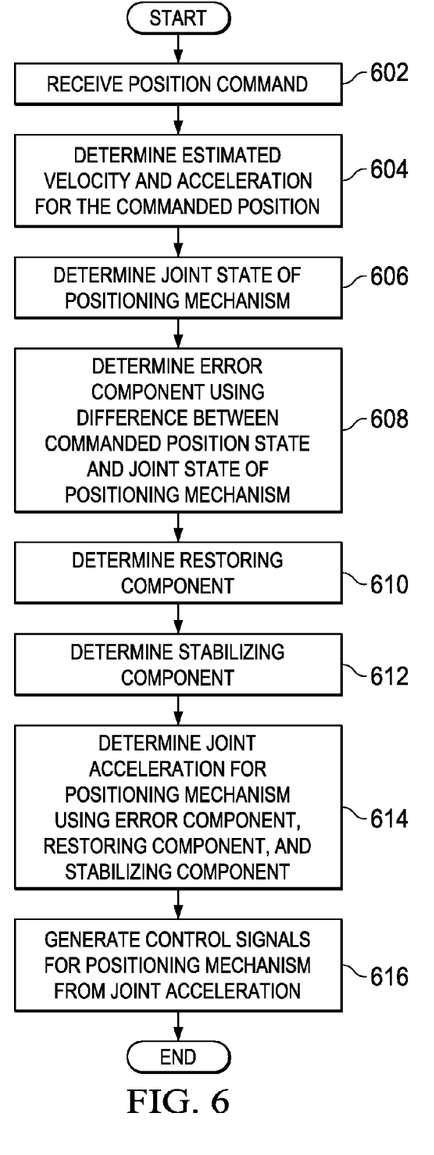
FIG. 6 is an illustration of a flowchart of another process for controlling a positioning system in accordance with an illustrative embodiment.

Turning now to FIG. 6, an illustration of a flowchart of another process for controlling a positioning system is depicted in accordance with an illustrative embodiment. The process of FIG. 6 may be used to control a positioning system comprising a smaller scale positioning mechanism configured to move a tool within a smaller scale work space and a larger scale positioning mechanism configured to change a position of the smaller scale work space within a larger scale work space. For example, the process of FIG. 6 may be implemented in positioning system controller 130 to control positioning system 100 in FIG. 1.

The process may begin by receiving a position command identifying a commanded position for the tool within the larger scale work space (operation 602). An estimated velocity and acceleration for the commanded position may be determined (operation 604). A joint state of the positioning mechanism may be determined (operation 606).

An error component may be determined using a difference between the commanded position state and the joint state of the positioning mechanism (operation 608). For example, without limitation, the error component may be determined using a first difference between the commanded position and a first sum of the position of the smaller scale positioning mechanism and the position of the larger scale positioning mechanism and a second difference between the estimated velocity for the commanded position and a second sum of the velocity of the smaller scale positioning mechanism and the velocity of the larger scale positioning mechanism.

A restoring component may be determined (operation 610). The restoring component may be configured to move the tool toward the center of the smaller scale work space. For example, without limitation, the restoring component may be determined using an integral of the position of the smaller scale positioning mechanism and the position of the smaller scale positioning mechanism.

A stabilizing component may be determined (operation 612). The stabilizing component may be configured to prevent unstable self-motion of the larger scale positioning mechanism. For example, without limitation, the stabilizing component may be determined using the velocity of the larger scale positioning mechanism.

Joint acceleration for the positioning mechanism may be determined using the error component, the restoring component, and the stabilizing component (operation 614). For example, without limitation, acceleration for the smaller scale positioning mechanism and acceleration for the larger scale positioning mechanism may be determined using the error component, the restoring component, the stabilizing component, and the estimated acceleration of the commanded position. Control signals for the positioning mechanism then may be generated from the joint acceleration (operation 616), with the process terminating thereafter. For example, control signals for controlling the smaller scale positioning mechanism and the larger scale positioning mechanism together to move the tool from the current position to the commanded position may be generated using the acceleration for the smaller scale positioning mechanism and the acceleration for the larger scale positioning mechanism.

Figure 7:
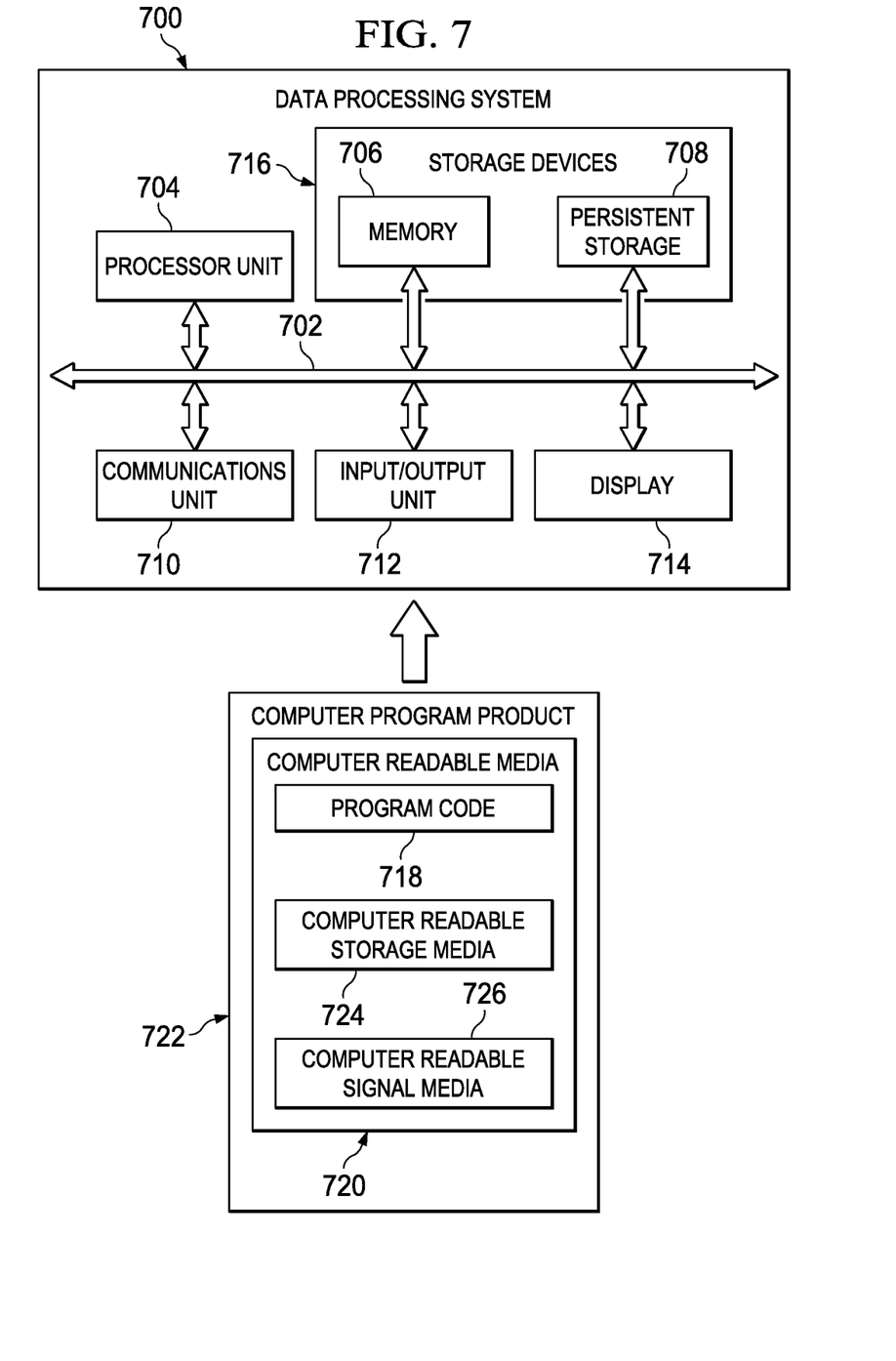
FIG. 7 is an illustration of a block diagram of a data processing system in accordance with an illustrative embodiment.

Turning now to FIG. 7, an illustration of a block diagram of a data processing system is depicted in accordance with an illustrative embodiment. In this example, data processing system 700 is an example of one implementation of a data processing system for implementing positioning system controller 130 in FIG. 1.

In this illustrative example, data processing system 700 includes communications fabric 702. Communications fabric 702 provides communications between processor unit 704, memory 706, persistent storage 708, communications unit 710, input/output (I/O) unit 712, and display 714. Memory 706, persistent storage 708, communications unit 710, input/output (I/O) unit 712, and display 714 are examples of resources accessible by processor unit 704 via communications fabric 702.

Processor unit 704 serves to run instructions for software that may be loaded into memory 706. Processor unit 704 may be a number of processors, a multi-processor core, or some other type of processor, depending on the particular implementation. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and other suitable information either on a temporary basis or a permanent basis. Storage devices 716 also may be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output (I/O) unit 712 allows for input and output of data with other devices that may be connected to data processing system 700. For example, input/output (I/O) unit 712 may provide a connection for user input through a keyboard, a mouse, and/or some other suitable input device. Further, input/output (I/O) unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer-implemented instructions, which may be located in a memory, such as memory 706.

These instructions are referred to as program instructions, program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code. As one example, data processing system 700 may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

Additionally, communications unit 710 may include a number of devices that transmit data, receive data, or both transmit and receive data. Communications unit 710 may be, for example, a modem or a network adapter, two network adapters, or some combination thereof. Further, a memory may be, for example, memory 706, or a cache, such as that found in an interface and memory controller hub that may be present in communications fabric 702.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus, comprising:
    a smaller scale positioning mechanism configured to move a tool within a smaller scale work space;
    a larger scale positioning mechanism configured to change a position of the smaller scale work space within a larger scale work space; and
    a positioning system controller configured to receive a position command identifying a commanded position for the tool within the larger scale work space, determine an error component using a difference between the commanded position and a current position of the tool in the larger scale work space, determine a restoring component configured to move the tool toward a selected position in the smaller scale work space, determine an acceleration for the smaller scale positioning mechanism and an acceleration for the larger scale positioning mechanism using the error component, the restoring component, and an estimated acceleration for the commanded position, and generate control signals for controlling the smaller scale positioning mechanism and the larger scale positioning mechanism together to move the tool from the current position to the commanded position using the error component and the restoring component.

2. The apparatus of claim 1, wherein the selected position is a center of the smaller scale work space.

3. The apparatus of claim 1, wherein the positioning system controller is further configured to:
    determine a stabilizing component configured to prevent unstable self-motion of the larger scale positioning mechanism, and
    generate the control signals for controlling the smaller scale positioning mechanism and the larger scale positioning mechanism together to move the tool from the current position to the commanded position using the error component, the restoring component, and the stabilizing component.

4. The apparatus of claim 1, wherein the positioning system controller is configured to:
    determine an estimated velocity for the commanded position and an estimated acceleration for the commanded position;
    determine a position of the smaller scale positioning mechanism, an integral of the position of the smaller scale positioning mechanism, a velocity of the smaller scale positioning mechanism, a position of the larger scale positioning mechanism, and a velocity of the larger scale positioning mechanism;
    determine the error component using a first difference between the commanded position and a sum of the position of the smaller scale positioning mechanism and the position of the larger scale positioning mechanism and a second difference between the estimated velocity for the commanded position and a sum of the velocity of the smaller scale positioning mechanism and the velocity of the larger scale positioning mechanism;

determine the restoring component using the integral of the position of the smaller scale positioning mechanism and the position of the smaller scale positioning mechanism;

generate the control signals using the acceleration for the smaller scale positioning mechanism and the acceleration for the larger scale positioning mechanism.

5. The apparatus of claim 1, wherein the smaller scale positioning mechanism is attached to the larger scale positioning mechanism and the larger scale positioning mechanism is configured to move the smaller scale positioning mechanism within the larger scale work space to change the position of the smaller scale work space within the larger scale work space.

6. The apparatus of claim 1, wherein the larger scale positioning mechanism is configured to move the larger scale work space with respect to the smaller scale positioning mechanism to change the position of the smaller scale work space within the larger scale work space.

7. The apparatus of claim 1, wherein the smaller scale work space is selected from a first two-dimensional area and a first three-dimensional volume and the larger scale work space is selected from a second two-dimensional area and a second three-dimensional volume.

8. The apparatus of claim 1 further comprising:
an aircraft component positioned in the larger scale work space and wherein the control signals are configured to control the smaller scale positioning mechanism and the larger scale positioning mechanism together to move the tool to the commanded position on the aircraft component.

9. A method for controlling a positioning mechanism comprising:
receiving, by a processor unit, a position command identifying a commanded position for a tool within a larger scale work space, wherein a smaller scale positioning mechanism is configured to move the tool within a smaller scale work space and a larger scale positioning mechanism is configured to change a position of the smaller scale work space within the larger scale work space;

determining, by the processor unit, an error component using a difference between the commanded position and a current position of the tool in the larger scale work space;

determining, by the processor unit, a restoring component configured to move the tool toward a selected position in the smaller scale work space;

determining an acceleration for the smaller scale positioning mechanism and an acceleration for the larger scale positioning mechanism using the error component, the restoring component, and an estimated acceleration for the commanded position; and generating control signals for controlling the smaller scale positioning mechanism and the larger scale positioning mechanism together to move the tool from the current position to the commanded position using the error component and the restoring component.

10. The method of claim 9, wherein the selected position is a center of the smaller scale work space.

11. The method of claim 9 further comprising:
determining a stabilizing component configured to prevent unstable self-motion of the larger scale positioning mechanism, and generating the control signals for controlling the smaller scale positioning mechanism and the larger scale positioning mechanism together to move the tool from the current position to the commanded position using the error component, the restoring component, and the stabilizing component.

12. The method of claim 9 further comprising:
determining an estimated velocity for the commanded position and an estimated acceleration for the commanded position;

determining a position of the smaller scale positioning mechanism, an integral of the position of the smaller scale positioning mechanism, a velocity of the smaller scale positioning mechanism, a position of the larger scale positioning mechanism, and a velocity of the larger scale positioning mechanism;

determining the error component using a first difference between the commanded position and a sum of the position of the smaller scale positioning mechanism and the position of the larger scale positioning mechanism and a second difference between the estimated velocity for the commanded position and a sum of the velocity of the smaller scale positioning mechanism and the velocity of the larger scale positioning mechanism;

determining the restoring component using the integral of the position of the smaller scale positioning mechanism and the position of the smaller scale positioning mechanism;

generating the control signals using the acceleration for the smaller scale positioning mechanism and the acceleration for the larger scale positioning mechanism.

13. The method of claim 9, wherein the smaller scale positioning mechanism is attached to the larger scale positioning mechanism and the larger scale positioning mechanism is configured to move the smaller scale positioning mechanism within the larger scale work space to change the position of the smaller scale work space within the larger scale work space.

14. The method of claim 9, wherein the larger scale positioning mechanism is configured to move the larger scale work space with respect to the smaller scale positioning mechanism to change the position of the smaller scale work space within the larger scale work space.

15. The method of claim 9, wherein the smaller scale work space is selected from a first two-dimensional area and a first three-dimensional volume and the larger scale work space is selected from a second two-dimensional area and a second three-dimensional volume.

16. The method of claim 9 further comprising:
positioning an aircraft component in the larger scale work space and generating the control signals for controlling the smaller scale positioning mechanism and the larger scale positioning mechanism together to move the tool to the commanded position on the aircraft component.

17. A method for controlling a positioning mechanism comprising:
receiving, by a processor unit, a position command identifying a commanded position for a tool within a larger scale work space, wherein a smaller scale positioning mechanism is configured to move the tool within a smaller scale work space and a larger scale positioning mechanism is configured to change a position of the smaller scale work space within the larger scale work space;

determining, by the processor unit, an estimated velocity for the commanded position and an estimated acceleration for the commanded position;

determining, by the processor unit, a position of the smaller scale positioning mechanism, an integral of the position of the smaller scale positioning mechanism, a velocity of the smaller scale positioning mechanism, a position of the larger scale positioning mechanism, and a velocity of the larger scale positioning mechanism;

determining, by the processor unit, an error component using a first difference between the commanded position and a first sum of the position of the smaller scale positioning mechanism and the position of the larger scale positioning mechanism and a second difference between the estimated velocity for the commanded position and a second sum of the velocity of the smaller scale positioning mechanism and the velocity of the larger scale positioning mechanism;

determining, by the processor unit, a restoring component using the integral of the position of the smaller scale positioning mechanism and the position of the smaller scale positioning mechanism;

determining an acceleration for the smaller scale positioning mechanism and an acceleration for the larger scale positioning mechanism using the error component, the restoring component, and the estimated acceleration for the commanded position; and generating control signals for controlling the smaller scale positioning mechanism and the larger scale positioning mechanism together to move the tool from a current position to the commanded position using the acceleration for the smaller scale positioning mechanism and the acceleration for the larger scale positioning mechanism.

18. The method of claim 17 further comprising:
determining a stabilizing component using the velocity of the larger scale positioning mechanism; and
determining the acceleration for the smaller scale positioning mechanism and the acceleration for the larger scale positioning mechanism using the error component, the restoring component, the estimated acceleration for the commanded position, and the stabilizing component.

19. The method of claim 17, wherein the smaller scale positioning mechanism is attached to the larger scale positioning mechanism and the larger scale positioning mechanism is configured to move the smaller scale positioning mechanism within the larger scale work space to change the position of the smaller scale work space within the larger scale work space.

20. The method of claim 17, wherein the larger scale positioning mechanism is configured to move the larger scale work space with respect to the smaller scale positioning mechanism to change the position of the smaller scale work space within the larger scale work space.

* * * * *